US009912700B2

(12) United States Patent
Jones-McFadden et al.

(10) Patent No.: US 9,912,700 B2
(45) Date of Patent: Mar. 6, 2018

(54) SYSTEM FOR ESCALATING SECURITY PROTOCOL REQUIREMENTS

(71) Applicant: Bank of America Corporation, Charlotte, NC (US)

(72) Inventors: Alicia C. Jones-McFadden, Fort Mill, SC (US); Joseph Neil Johansen, Rock Hill, SC (US)

(73) Assignee: Bank of America Corporation, Charlotte, NC (US)

( * ) Notice: Subject to any disclaimer, the term of this patent is extended or adjusted under 35 U.S.C. 154(b) by 152 days.

(21) Appl. No.: 14/987,553

(22) Filed: Jan. 4, 2016

(65) Prior Publication Data
US 2017/0195366 A1    Jul. 6, 2017

(51) Int. Cl.
G06F 17/00     (2006.01)
H04L 29/06     (2006.01)

(52) U.S. Cl.
CPC .......... H04L 63/20 (2013.01); H04L 63/0876 (2013.01); H04L 63/1425 (2013.01)

(58) Field of Classification Search
CPC .. H04L 63/0876; H04L 63/20; H04L 63/1425
USPC ........................................................ 726/1
See application file for complete search history.

(56) References Cited

U.S. PATENT DOCUMENTS

| 5,475,839 A | 12/1995 | Watson et al. |
| 5,655,004 A | 8/1997 | Holbrook |
| 7,071,113 B2 | 7/2006 | Kim et al. |
| 7,600,676 B1 | 10/2009 | Rados et al. |
| 7,707,120 B2 | 4/2010 | Dominguez et al. |

(Continued)

FOREIGN PATENT DOCUMENTS

GB    401015 A    11/1933

OTHER PUBLICATIONS

Rocha et al.; A2BeST: An adaptive authentication service based on mobile user's behavior and spatio-temporal context; Published in: Computers and Communications (ISCC), 2011 IEEE Symposium on; Date of Conference: Jun. 28-Jul. 1, 2011; 2011; IEEE Xplore.

(Continued)

Primary Examiner — Dant Shaifer Harriman
(74) Attorney, Agent, or Firm — Michael A. Springs; Moore & Van Allen PLLC; Peter B. Stewart

(57) ABSTRACT

Disclosed is a system for escalating security protocol requirements. The system typically includes a processor, a memory, and a security protocol module stored in the memory. The module is typically configured for: monitoring electronic activities associated with a user and collecting device identification information for local network devices associated with the electronic activities; receiving from the user a request to perform a subsequent electronic activity using a first computing device in communication with a first local network; collecting device identification information associated with the first computing device; identifying one or more local network devices in communication with the first local network and collecting device identification information associated with the local network devices in communication with the first local network; and denying the subsequent electronic activity or increasing or decreasing a level of authentication required to complete the subsequent electronic activity based on the collected device identification information.

20 Claims, 9 Drawing Sheets

(56) References Cited

U.S. PATENT DOCUMENTS

| | | |
|---|---|---|
| 7,769,991 B2 | 8/2010 | Niemelä |
| 7,899,753 B1 | 3/2011 | Everhart |
| 7,900,262 B2 * | 3/2011 | Ozawa ............... G06F 21/608 713/166 |
| 8,087,085 B2 | 12/2011 | Hu et al. |
| 8,195,576 B1 | 6/2012 | Grigg et al. |
| 8,312,545 B2 | 11/2012 | Tuvell et al. |
| 8,341,749 B2 | 12/2012 | Rogel |
| 8,346,666 B2 | 1/2013 | Lindelsee et al. |
| 8,355,982 B2 | 1/2013 | Hazel et al. |
| 8,380,177 B2 | 2/2013 | Laracey |
| 8,522,039 B2 | 8/2013 | Hyndman et al. |
| 8,572,391 B2 | 10/2013 | Golan et al. |
| 8,595,491 B2 | 11/2013 | Nice et al. |
| 8,635,157 B2 | 1/2014 | Smith et al. |
| 8,713,684 B2 | 4/2014 | Bettini et al. |
| 8,782,792 B1 | 7/2014 | Bodke |
| 8,819,772 B2 | 8/2014 | Bettini et al. |
| 8,844,038 B2 | 9/2014 | Niemelä |
| 8,863,279 B2 | 10/2014 | McDougal et al. |
| 8,904,525 B1 | 12/2014 | Hodgman et al. |
| 8,984,632 B1 | 3/2015 | Laffoon et al. |
| 9,058,607 B2 | 6/2015 | Ganti et al. |
| 9,064,115 B2 | 6/2015 | Tuvell et al. |
| 9,069,957 B2 | 6/2015 | Tuvell et al. |
| 9,104,871 B2 | 8/2015 | Tuvell et al. |
| 9,143,529 B2 | 9/2015 | Qureshi et al. |
| 9,363,278 B2 | 6/2016 | Maria |
| 9,569,767 B1 | 2/2017 | Lewis |
| 9,654,982 B2 | 5/2017 | Bank et al. |
| 2006/0021003 A1 | 1/2006 | Fisher et al. |
| 2006/0073811 A1 | 4/2006 | Ekberg |
| 2006/0123465 A1 | 6/2006 | Ziegler |
| 2007/0030539 A1 | 2/2007 | Nath et al. |
| 2009/0254975 A1 | 10/2009 | Turnbull et al. |
| 2009/0265775 A1 | 10/2009 | Wisely et al. |
| 2010/0051685 A1 | 3/2010 | Royyuru et al. |
| 2010/0125495 A1 | 5/2010 | Smith et al. |
| 2011/0047597 A1 | 2/2011 | Mahaffey et al. |
| 2011/0145920 A1 | 6/2011 | Mahaffey et al. |
| 2012/0151559 A1 * | 6/2012 | Koudys ............... G06F 21/316 726/3 |
| 2012/0197740 A1 | 8/2012 | Grigg et al. |
| 2012/0265631 A1 | 10/2012 | Cronic et al. |
| 2012/0329388 A1 | 12/2012 | Royston et al. |
| 2013/0023240 A1 | 1/2013 | Weiner |
| 2013/0174265 A1 | 7/2013 | Chan et al. |
| 2013/0226800 A1 | 8/2013 | Patel et al. |
| 2013/0232542 A1 | 9/2013 | Cheng et al. |
| 2013/0275303 A1 | 10/2013 | Fiore et al. |
| 2013/0282588 A1 | 10/2013 | Hruska |
| 2013/0347100 A1 | 12/2013 | Tsukamoto et al. |
| 2014/0372308 A1 | 12/2014 | Sheets |
| 2015/0220907 A1 | 8/2015 | Denton et al. |
| 2016/0134488 A1 * | 5/2016 | Straub ............... G06F 21/44 726/4 |
| 2016/0173506 A1 | 6/2016 | Bank et al. |
| 2016/0173508 A1 | 6/2016 | Koziovsky et al. |
| 2016/0180322 A1 | 6/2016 | Song et al. |
| 2016/0255050 A1 * | 9/2016 | Grayson ............... H04L 63/029 726/1 |
| 2017/0032114 A1 | 2/2017 | Turgeman |

OTHER PUBLICATIONS

Xiong et al.; A spatial entropy-based approach to improve mobile risk-based authentication; Published in: Proceeding Geo Privacy '14 Proceedings of the 1st ACM SIGSPATIAL International Workshop on Privacy in Geographic Information Collection and Analysis Article No. 3; 2014; ACM Digital Library.

Meyer, Roger. Secure Authentication on the Internet (Apr. 4, 2007). Retrieved online Mar. 27, 2012. http://www.sans.org/reading_room/whitepapers/securecode/secure-authentication-internet_2084. 36 pps.

* cited by examiner

SYSTEM FOR ESCALATING SECURITY PROTOCOL REQUIREMENTS

FIELD OF THE INVENTION

The present invention embraces a system for escalating security protocol requirements. The system typically includes a processor, a memory, and a security protocol module stored in the memory. The security protocol module is typically configured to monitor electronic activities and collect device identification information for devices associated with the electronic activities. Thereafter, security protocol module may receive a request to perform a subsequent electronic activity using a first computing device in communication with a first local network; collecting device identification information associated with the first computing device; collecting device identification information associated with local network devices in communication with the first local network; and increasing or decreasing security protocol requirements based on the collected device identification information.

BACKGROUND

Over the last few years, there has been a significant increase in the number of electronic activities. Accordingly, a need exists for improving the security of such electronic activities.

SUMMARY

In one aspect, the present invention embraces a computerized system for escalating security protocol requirements and a corresponding method and computer program product. The system typically includes a processor and a memory. The system also typically includes a security protocol module stored in the memory and executable by the processor. In one embodiment, the security protocol module is configured for: monitoring first electronic activities associated with a user, wherein monitoring the first electronic activities comprises collecting device identification information for local network devices associated with the first electronic activities; receiving from the user a request to perform a subsequent electronic activity using a first computing device, the first computing device being in communication with a first local network; based on receiving the request to perform the subsequent electronic activity, collecting device identification information associated with the first computing device; based on receiving the request to perform the subsequent electronic activity, identifying one or more local network devices in communication with the first local network and collecting device identification information associated with the local network devices in communication with the first local network; and, based on (i) the collected device identification information for the local network devices associated with the first electronic activities, (ii) the device identification information associated with the first computing device, or (iii) the device identification information associated with the local network devices in communication with the first local network, denying the subsequent electronic activity, increasing a level of authentication required to complete the subsequent electronic activity, or decreasing the level of authentication required to complete the subsequent electronic activity.

In a particular embodiment, the security protocol module is configured for: determining that the device identification information associated with the first computing device matches the collected device identification information for one of the local network devices associated with one of the first electronic activities; and decreasing the level of authentication required to complete the subsequent electronic activity based on determining that the device identification information associated with the first computing device matches the collected device identification information for one of the local network devices associated with one of the first electronic activities.

In another particular embodiment, monitoring the first electronic activities associated with the user comprises identifying a preferred local network associated with the user and collecting device identification information for local network devices associated with the preferred local network. In addition, the security protocol module is configured for: determining that the device identification information associated with the first computing device matches the collected device identification information for one of the local network devices associated with the preferred local network; and decreasing the level of authentication required to complete the subsequent electronic activity based on determining that the device identification information associated with the first computing device matches the collected device identification information for one of the local network devices associated with the preferred local network.

In yet another particular embodiment, the security protocol module is configured for: determining that the device identification information associated with one of the local network devices in communication with the first local network matches device identification information from a restricted device database; and denying the subsequent electronic activity or increasing the level of authentication required to complete the subsequent electronic activity based on determining that the device identification information associated with one of the local network devices in communication with the first local network matches device identification information from a restricted device database.

In yet another particular embodiment, the security protocol module is configured for: determining that the device identification information associated with one of the local network devices in communication with the first local network does not match device identification information from a previous device database associated with the first local network; and denying the subsequent electronic activity or increasing the level of authentication required to complete the subsequent electronic activity based on determining that the device identification information associated with one of the local network devices in communication with the first local network does not match device identification information from a previous device database associated with the first local network.

In another particular embodiment, monitoring the first electronic activities associated with the user comprises identifying a preferred local network associated with the user and collecting device identification information for local network devices associated with the preferred local network. In addition, the security protocol module is configured for: determining that the first local network is the preferred local network; determining that the device identification information associated with one of the local network devices in communication with the first local network does not match the collected device identification information for the local network devices associated with the preferred local network; and denying the subsequent electronic activity or increasing the level of authentication required to complete the subsequent electronic activity based on (i) determining that the first local network is the preferred local network and (ii)

determining that the device identification information associated with one of the local network devices in communication with the first local network does not match the collected device identification information for the local network devices associated with the preferred local network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
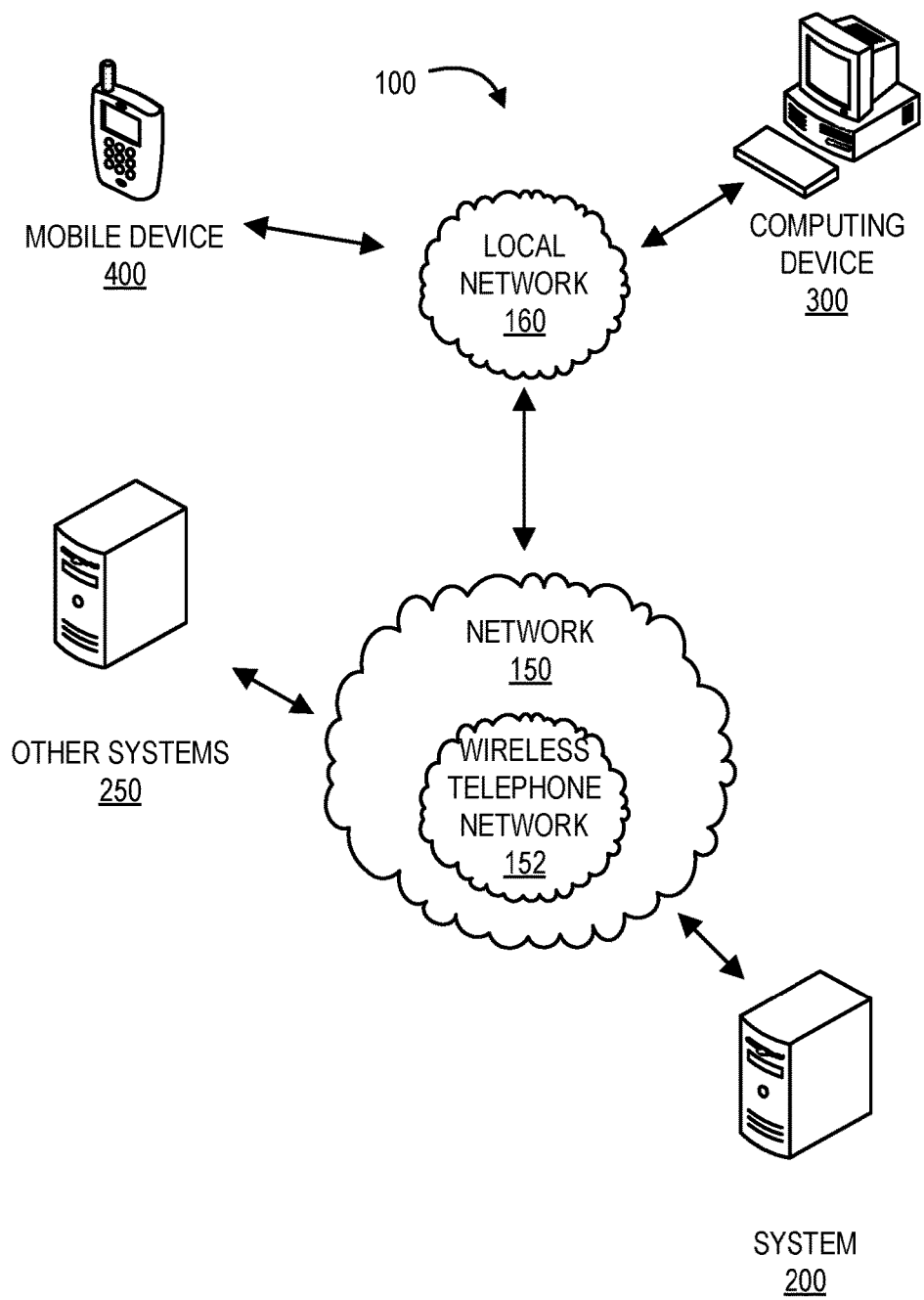
Figure 2:
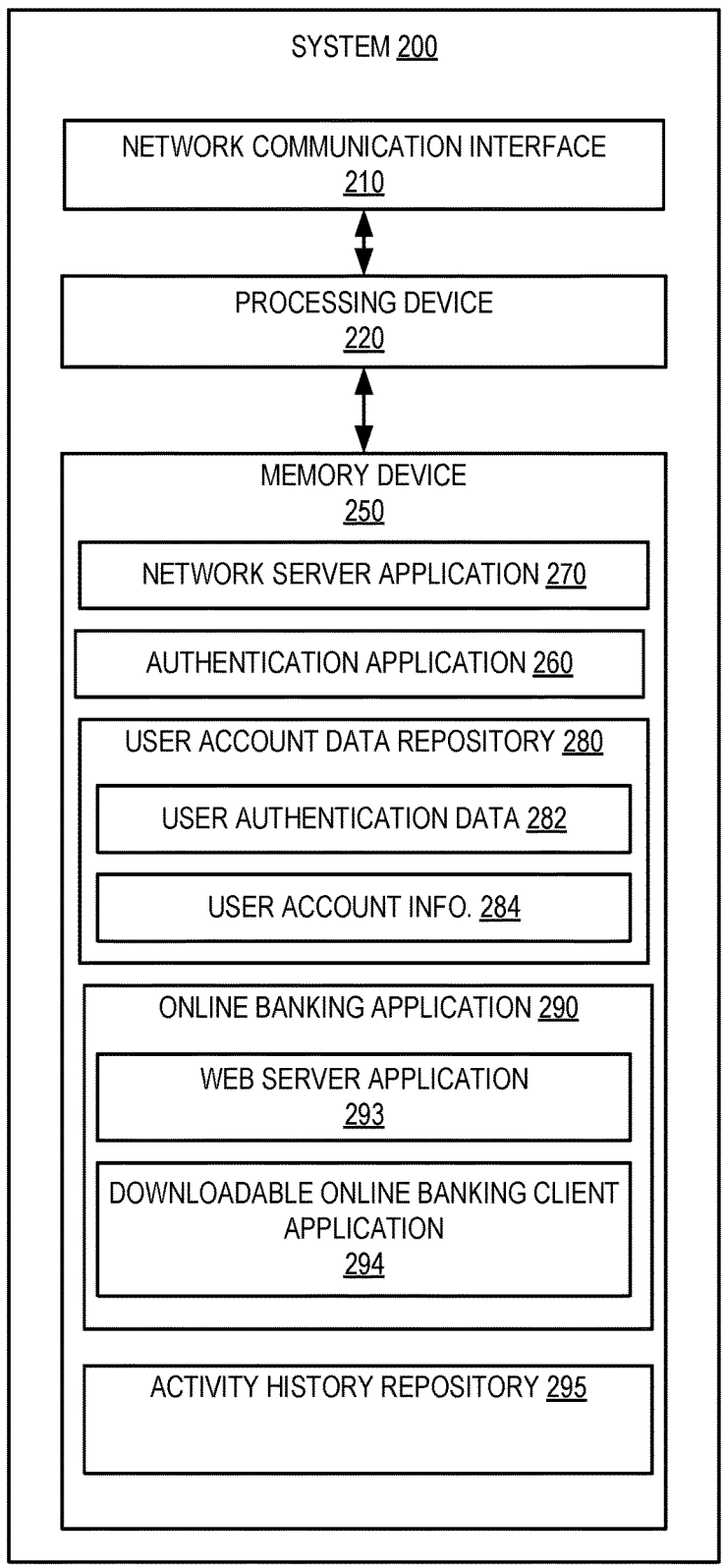

Having thus described embodiments of the invention in general terms, reference will now be made the accompanying drawings, wherein:

FIG. 1 depicts a system and environment in accordance with an aspect of the present invention;

FIG. 2 schematically depicts a system in accordance with an aspect of the present invention.

Figure 3:
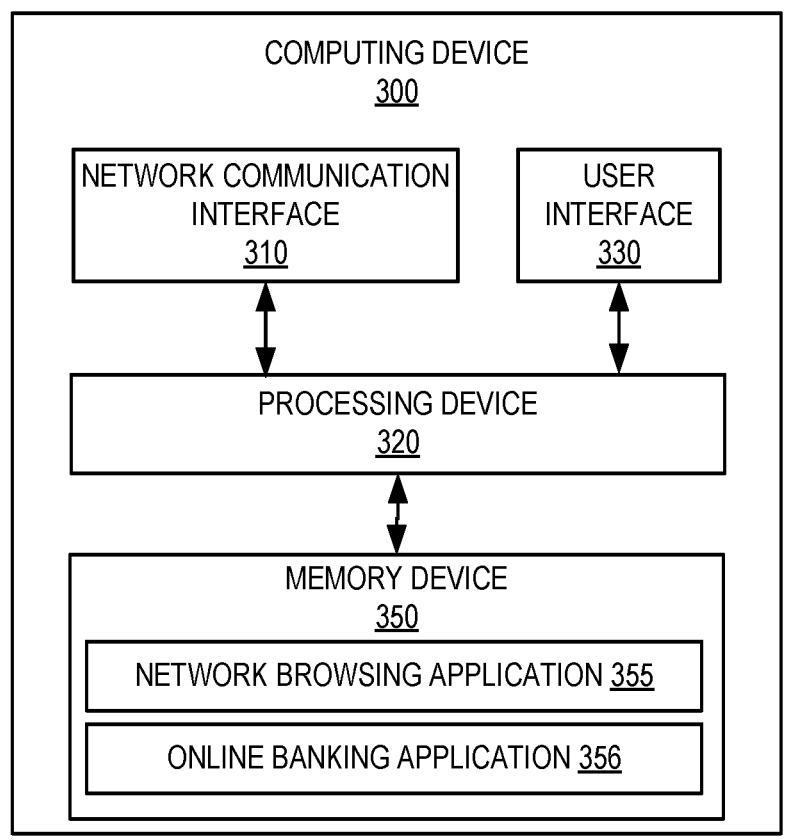
Figure 4:
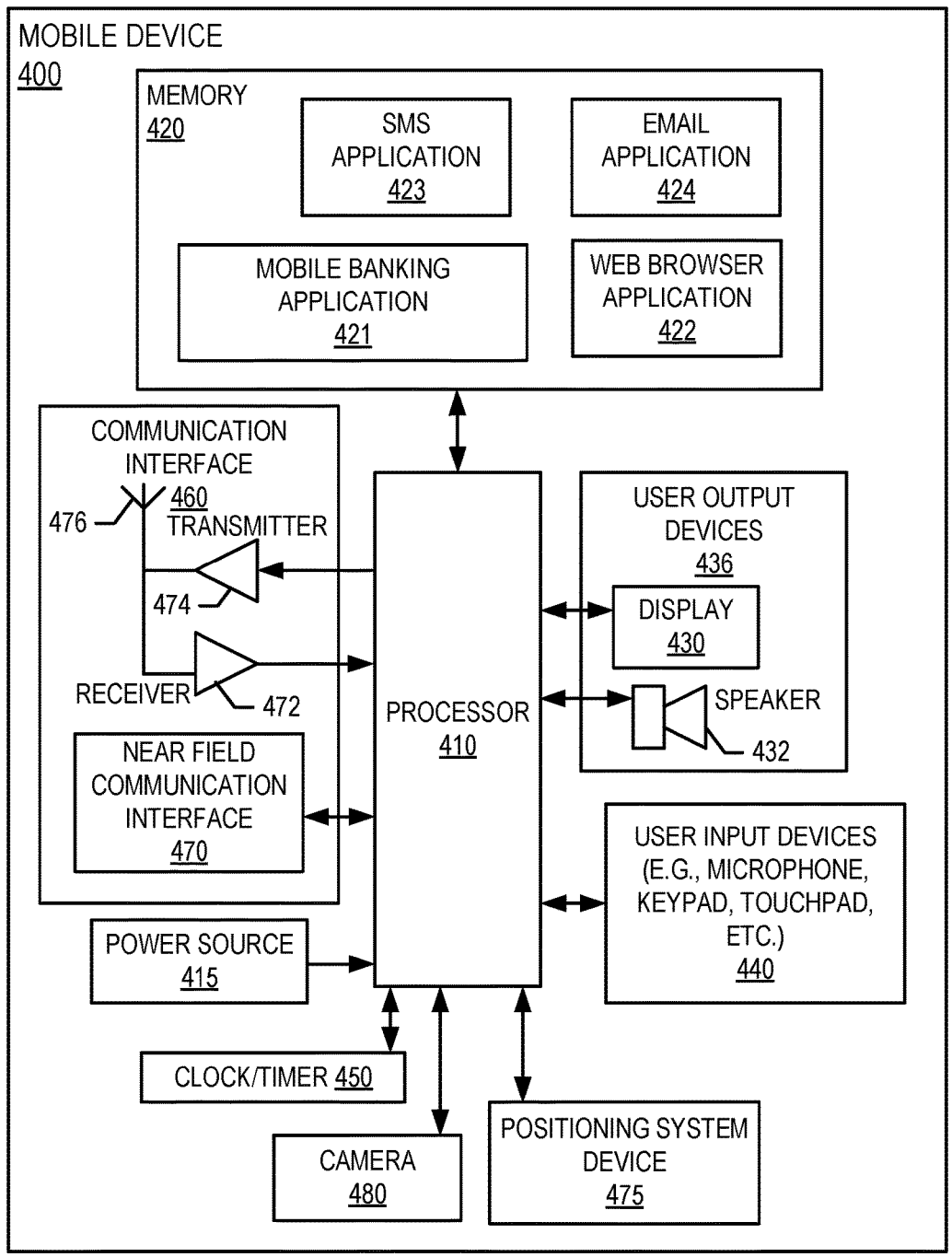
Figure 5:
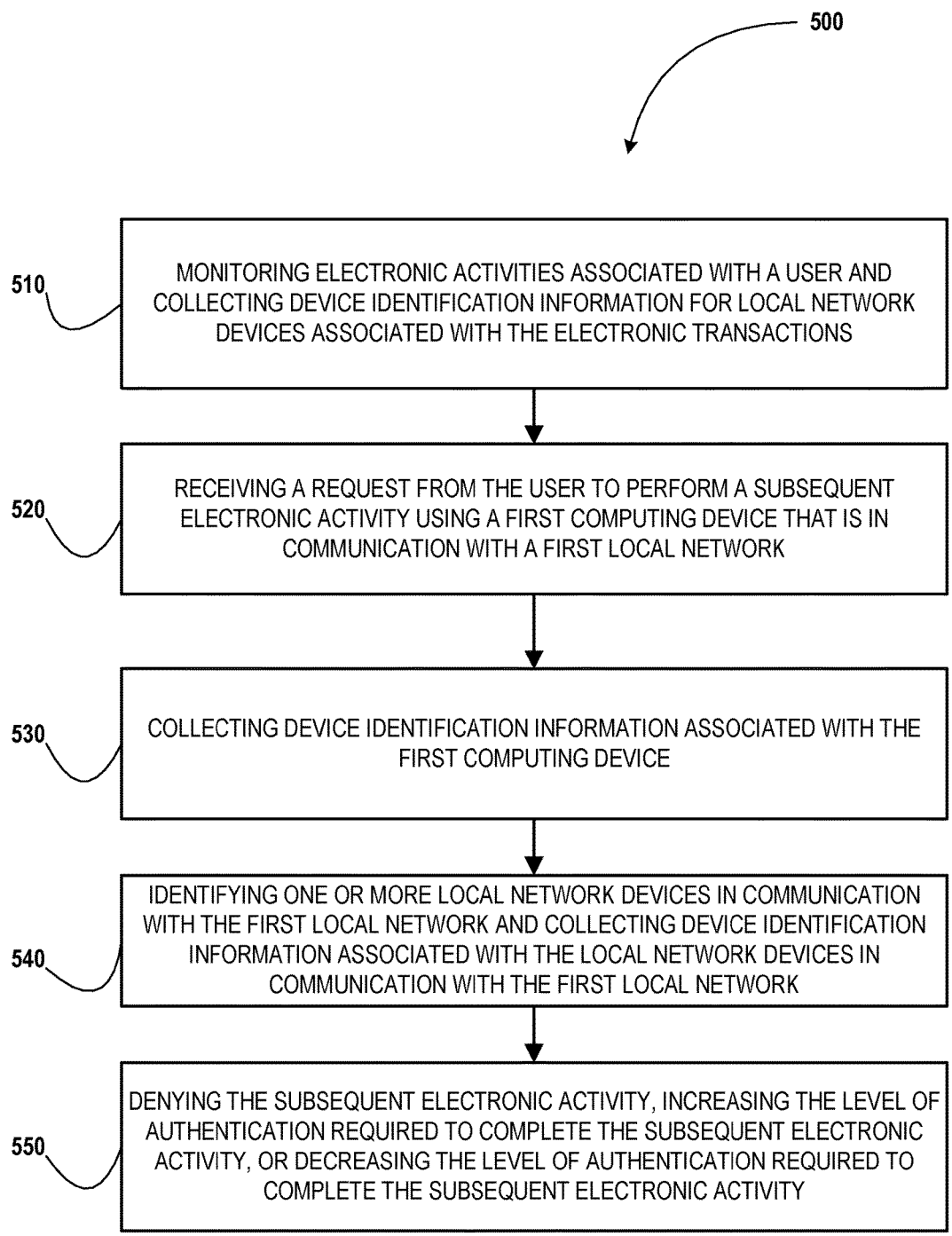
Figure 6A:
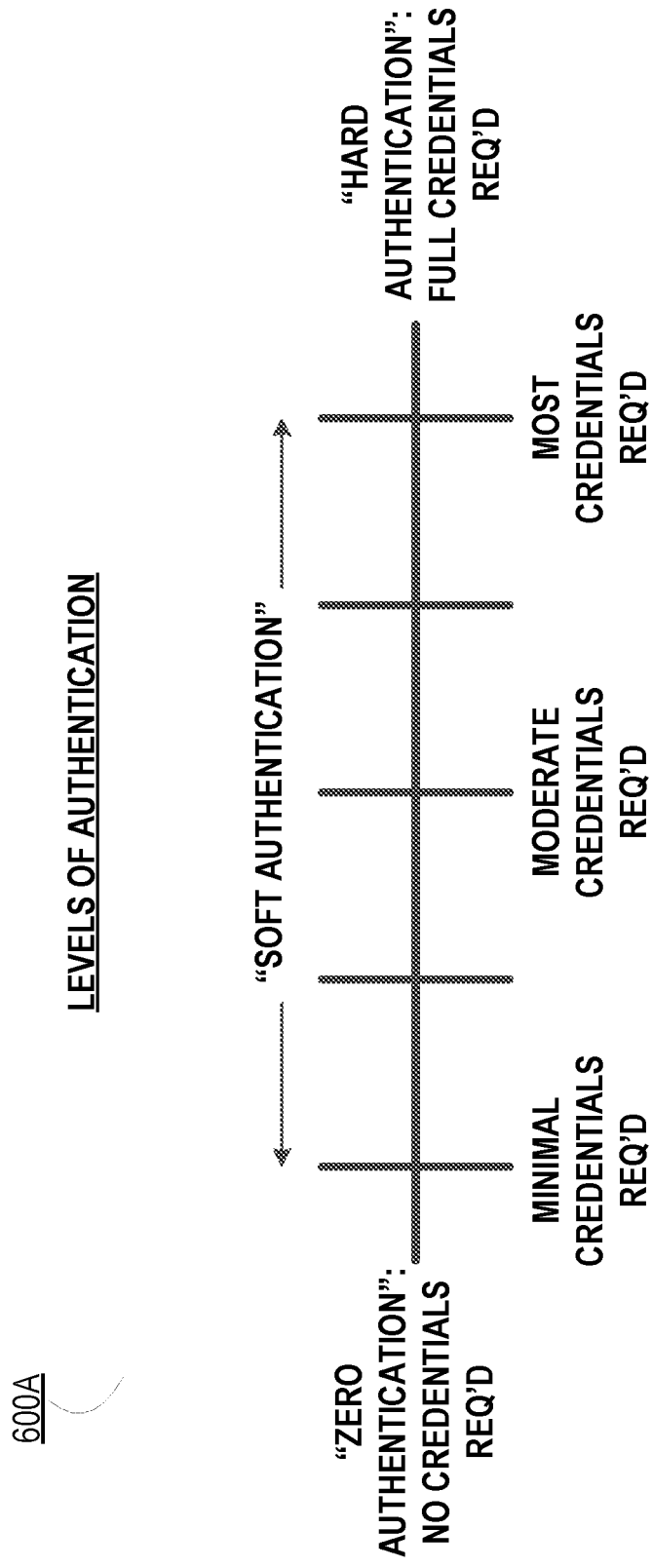
Figure 6B:
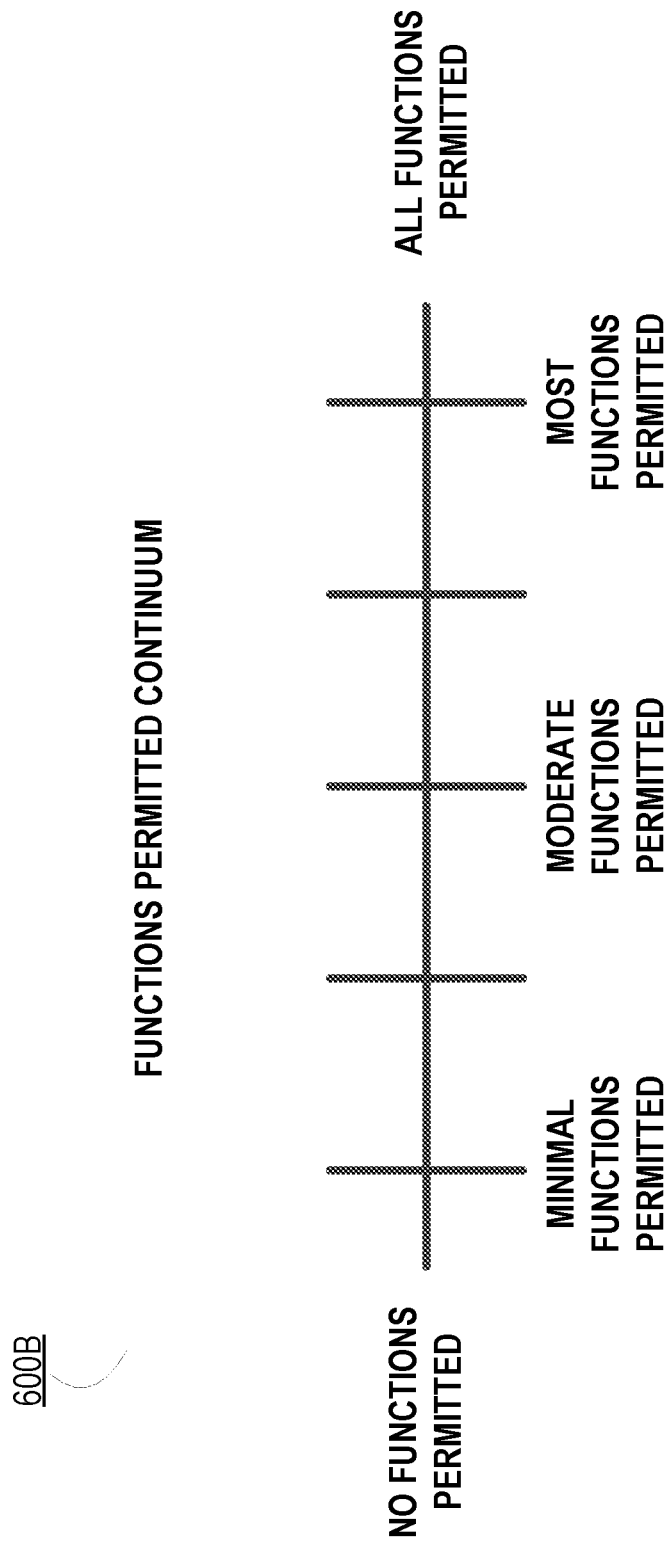
Figure 6C:
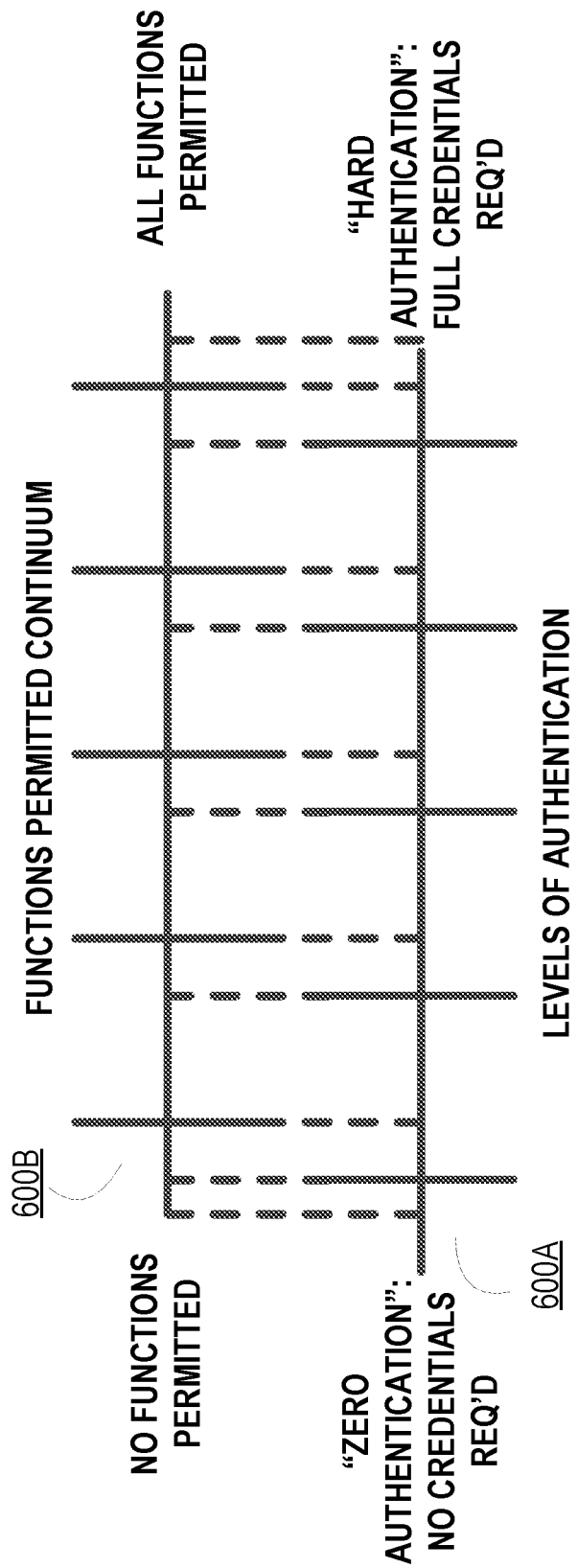
Figure 6D:
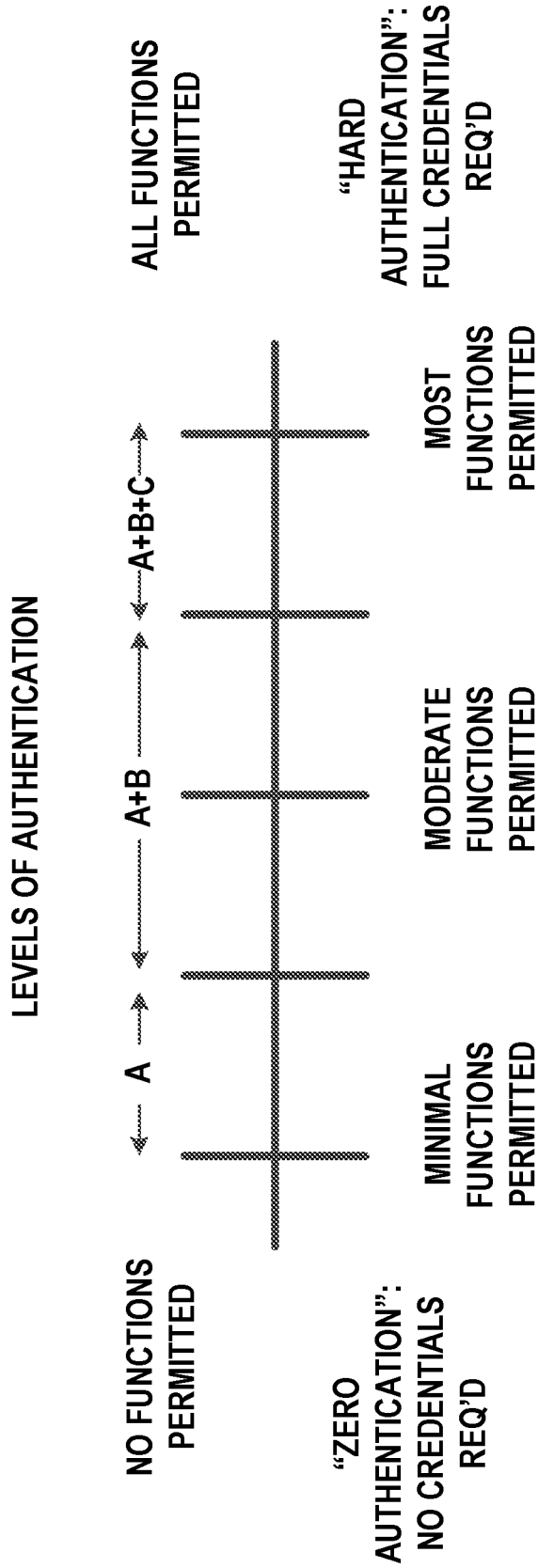

FIG. 3 schematically depicts a computing device in accordance with an aspect of the present invention;

FIG. 4 schematically depicts a mobile device in accordance with an aspect of the present invention;

FIG. 5 depicts a method for escalating security protocol requirements in accordance with an aspect of the present invention;

FIG. 6A presents an illustration of the authentication continuum in accordance to one embodiment of the invention;

FIG. 6B presents an illustration of the functions permitted continuum in accordance to one embodiment of the invention;

FIG. 6C presents an illustration of the coupling of the functions permitted continuum and the levels of authentication continuum in accordance to one embodiment of the invention; and FIG. 6D presents an illustration of the relationship between the functions permitted and the authentication types in accordance to one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

Unless specifically limited by the context, a "transaction" or "activity" refers to any communication between the user and the financial institution or other entity monitoring the user's activities. In some embodiments, for example, a transaction may refer to a purchase of goods or services, a return of goods or services, a payment transaction, a credit transaction, or other interaction involving a user's bank account. Typically, a transaction is an electronic transaction or electronic activity in which the user is employing a mobile device, computing device, or other electronic device to complete the transaction. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a transaction may occur when an entity associated with the user is alerted via the transaction of the user's location. A transaction may occur when a user accesses a building, uses a rewards card, and/or performs an account balance query. A transaction may occur as a user's device establishes a wireless connection, such as a Wi-Fi connection, with a point-of-sale terminal. In some embodiments, a transaction may include one or more of the following: purchasing, renting, selling, and/or leasing goods and/or services (e.g., groceries, stamps, tickets, DVDs, vending machine items, and the like); withdrawing cash; making payments to creditors (e.g., paying monthly bills; paying federal, state, and/or local taxes; and the like); sending remittances; transferring balances from one account to another account; loading money onto stored value cards (SVCs) and/or prepaid cards; donating to charities; and/or the like.

As used herein, an "online banking account" is an account that is associated with one or more user accounts at a financial institution. For example, the user may have an online banking account that is associated with the user's checking account, savings account, investment account, and/or credit account at a particular financial institution. A username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded). In other embodiments, the "customer" may refer to the user.

In one aspect, the present invention generally relates to a system that monitors electronic activities performed by a user using a computing device to identify other devices that are connected to the same local network as the user's computing device. Based on this monitoring the system may later increase or decrease the level of authentication required to complete a transaction (i.e., an activity). For example, if another device on the local network is a device that is not typically connected to the local network or is known to be associated with prior unauthorized activities, then the system may increase the level of authentication required to complete a transaction. By way of further example, the user might not be using their typical device to perform an electronic transaction, but instead may be using a device that is typically located on the local network. Based on a user using a device typically located on the local network, the system may reduce the level of authentication required to perform a transaction.

FIG. 1 provides a block diagram illustrating a system 200 and environment 100, in accordance with an embodiment of the present invention. As illustrated in FIG. 1, the banking environment 100 typically includes a system 200, which is typically a financial institution's banking system 200, a mobile device 400, and/or a computing device 300. The computing device may be any device that employs a processor and memory and can perform computing functions, such as a personal computer or a mobile device. As used herein, a "mobile device" is any mobile communication device, such as a cellular telecommunications device (i.e., a cell phone or mobile phone), personal digital assistant (PDA), a mobile Internet accessing device, a tablet computer, a laptop, or other mobile device. The banking environment 100 may also include other systems 250 (e.g., third party computer systems or devices). In some embodiments, the other systems 250 may include a merchant's point-of-transaction terminal or an automated teller machine, either of which may be configured to communicate with a user's mobile device (e.g., via NFC reader). In other embodiments, a computing device 300 may be a merchant's point-of-transaction terminal or an automated teller machine.

The banking system 200, other systems 250, mobile device 400, and the computing device 300 are typically configured to communicate with one another over a network 150. The banking system 200, the mobile device 400, and the computing device 300 are each described in greater detail below with reference to FIGS. 2-4. The network 150 may include a local area network (LAN), a wide area network (WAN), and/or a global area network (GAN). In one embodiment, the network 150 includes the Internet. In one embodiment, the network 150 includes a wireless telephone network 152. The mobile device 400 and the computing device 300 may be in communication with a local network 160 (e.g., a local area network (LAN)) through which the mobile device 400 and the computing device 300 connect to the network 150. The network 150 and local network 160 may provide for wireline, wireless, or a combination of wireline and wireless communication between devices in the networks.

In general, the mobile device 400, and/or the computing device 300 are configured to connect with network 150 via the local network 160. The mobile device 400 and/or the computing device 300 may be used by a user to perform one or more electronic activities (e.g., by logging the user into the banking system 200 or otherwise authenticating the identity of the user). The mobile device 400 and/or the computing device 300 may be another device that is concurrently connected to the local network 160 while the user is performing an electronic activity (e.g., the computing device 300 may be connected to the local network 160 while the user is using the mobile device 400 to perform an electronic activity, such as a mobile wallet transaction). The banking system 200 involves authentication of the user before allowing the user to complete an electronic activity. For example, the banking system 200 may be a system where the user logs into his/her account such that the user can access data that is associated with the user. For example, in one embodiment of the invention, the system 200 may allow the user to use the mobile device 400 or computing device 300 to log into the user's online banking account or perform a mobile wallet transaction. Logging into the banking system 200 generally requires that the user authenticate his/her identity using a user name, a passcode, a cookie, a biometric identifier, a PIN, a private key, a token, and/or another authentication mechanism that is provided by the user to the banking system 200 via the mobile device 400 and/or the computing device 300.

The financial institution's banking system 200 is typically in network communication with other devices. In one embodiment, an application download server may be used to download online and/or mobile banking software applications that interacts with the banking system 200 to the mobile device 400 and/or computing device 300. In some embodiments of the invention, the application download server is configured to be controlled and managed by one or more third-party data providers (not shown in FIG. 1) over the network 150. In other embodiments, the application download server is configured to be controlled and managed over the network 150 by the same entity that maintains the banking system 200.

FIG. 2 provides a block diagram illustrating the banking system 200 in greater detail, in accordance with an embodiment of the invention. As illustrated in FIG. 2, in one embodiment of the invention, the banking system 200 includes a processing device 220 operatively coupled to a network communication interface 210 and a memory device 250. In certain embodiments, the banking system 200 is operated by a financial institution, while in other embodiments, the banking system 200 is operated by an entity other than a financial institution.

It should be understood that the memory device 250 may include one or more databases or other data structures/repositories. The memory device 250 also includes computer-executable program code that instructs the processing device 220 to operate the network communication interface 210 to perform certain communication functions of the banking system 200 described herein. For example, in one embodiment of the banking system 200, the memory device 250 includes, but is not limited to, a network server application 270, an authentication application 260, a user account data repository 280 which includes user authentication data 282 and user account information 284, an activity history repository 295, an online banking application 290 which includes a web server application 293, a downloadable online banking client application 294, and other computer-executable instructions or other data. The computer-executable program code of the network server application 270, the authentication application 260, or the online banking application 290 may instruct the processing device 220 to perform certain logic, data-processing, and data-storing functions of the banking system 200 described herein, as well as communication functions of the banking system 200. In this regard, the processing device 220 is typically configured to monitor electronic activities, identify devices connected to the same local network as the device performing an electronic activity, and adjust the level the authentication required to perform an electronic activity. These processes may be performed by a security protocol module stored in the memory device 250.

In one embodiment, the user account data repository 280 includes user authentication data 282 and user account information 284. The network server application 270, the authentication application 260, and the online banking application 290 are typically configured to employ user account information 284 and the user authentication data 282 (e.g., user identification information) when authenticating a user to the banking system 200. In this regard, the user authentication data 282 may include a user's username, password, PIN number, and device identification information associated with a computing device. The user account information 284 may include account identification information. The activity history repository 295 typically includes information regarding previous activities performed by a user, such as the identity of devices used by the user to perform activities, the identity of local networks connected to such devices, and the identity of other devices connected to such local networks (e.g., at the time of prior activities). In some embodiments, the memory device 250 may include a restricted device database. This restricted device database may identify devices associated with previous unauthorized activities or other undesirable activities.

As used herein, a "communication interface" typically includes a modem, server, transceiver, and/or other device for communicating with other devices on a network, and/or a user interface for communicating with one or more users. Referring again to FIG. 2, the network communication interface 210 is a communication interface having one or more communication devices configured to communicate with one or more other devices on the network 150, such as other systems 250, the mobile device 400, and the computing device 300. The processing device 220 is typically configured to use the network communication interface 210 to transmit and/or receive data and/or commands to and/or from the other devices connected to the network 150.

Referring now to FIG. 3, the computing device 300 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with the banking system 200 (shown in FIG. 1) for the purpose accessing a user's online banking account or otherwise allowing a user to perform an electronic activity. In another embodiment, an online banking application 356 allows the user of the computing device 300 to a user's online banking account.

As used herein, a "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in a memory. As the phrase is used herein, a processing device 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 330 generally includes a plurality of interface devices and/or software that allow a user to input commands and data to direct the processing device to execute instructions. For example, the user interface 330 presented in FIG. 3 may include a graphical user interface (GUI) or an interface to input computer-executable instructions that direct the processing device 320 to carry out specific functions. In this regard, the graphical user interface may include one or more buttons linked to one or more access restriction procedures that allow the user to request that an access restriction procedure be implemented. The user interface 330 employs certain input and output devices to input data received from the user or output data to the user. These input and output devices may include a display, mouse, keyboard, button, touchpad, touch screen, microphone, speaker, LED, light, joystick, switch, buzzer, bell, and/or other user input/output device for communicating with one or more users.

As used herein, a "memory device" 350 generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein.

FIG. 4 provides a block diagram illustrating the mobile device 400 in more detail, in accordance with embodiments of the invention. In one embodiment of the invention, the mobile device 400 is a mobile telephone. However, it should be understood, however, that a mobile telephone is merely illustrative of one type of mobile device that may benefit from, employ, or otherwise be involved with embodiments of the present invention and, therefore, should not be taken to limit the scope of embodiments of the present invention. Other types of mobile devices may include portable digital assistants (PDAs), pagers, mobile televisions, gaming devices, laptop computers, cameras, video recorders, audio/video player, radio, GPS devices, or any combination of the aforementioned.

The mobile device 400 typically includes a processor 410 communicably coupled to such devices as a memory 420, user output devices 436, user input devices 440, a communication interface 460, a power source 415, a clock or other timer 450, a camera 480, and a positioning system device 475. The processor 410, and other processors described herein, typically includes circuitry for implementing communication and/or logic functions of the mobile device 400. For example, the processor 410 may include a digital signal processor device, a microprocessor device, and various analog to digital converters, digital to analog converters, and/or other support circuits. Control and signal processing functions of the mobile device 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the mobile device 400 to transmit and receive web content, such as, for example, location-based content and/or other web page content, according to a Wireless Application Protocol (WAP), Hypertext Transfer Protocol (HTTP), and/or the like.

The processor 410 is typically configured to use the communication interface 460 to communicate with one or more other devices on the network 150. In this regard, the communication interface 460 typically includes an antenna 476 operatively coupled to a transmitter 474 and a receiver 472 (together a "transceiver"). The processor 410 is typically configured to provide signals to and receive signals from the transmitter 474 and receiver 472, respectively. The signals may include signaling information in accordance with the air interface standard of the applicable cellular system of the wireless telephone network 152. In this regard, the mobile device 400 may be configured to operate with one or more air interface standards, communication protocols, modulation types, and access types. By way of illustration, the mobile device 400 may be configured to operate in accordance with any of a number of first, second, third, and/or fourth-generation communication protocols and/or the like. For example, the mobile device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 400 may also be configured to operate in accordance with non-cellular communication mechanisms, such as via a wireless local area network (WLAN) or other communication/data networks.

The communication interface 460 may also include a near field communication (NFC) interface 470. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 470 may include a smart card, key card, proximity card, Bluetooth® device, radio frequency identification (RFID) tag and/or reader, transmitter, receiver, and/or the like. In some embodiments, the NFC interface 470 communicates information via radio, infrared (IR), and/or optical transmissions. In some embodiments, the NFC interface 470 is configured to operate as an NFC transmitter and/or as an NFC receiver (e.g., an NFC reader). Also, it will be understood that the NFC interface 470 may be embedded, built, carried, and/or otherwise supported in and/or on the mobile device 400. In some embodiments, the NFC interface 470 is not supported in and/or on the mobile device 400, but the NFC interface 470 is otherwise operatively connected to the mobile device 400 (e.g., where the NFC interface 470 is a peripheral device plugged into the mobile device 400). Other apparatuses having NFC interfaces mentioned herein may be configured similarly. In some embodiments, the NFC interface 470 of the mobile device 400 is configured to contactlessly and/or wirelessly communicate information to and/or from a corresponding NFC interface of another apparatus (e.g., an automated teller machine (ATM) or another mobile or computing device).

The mobile device 400 typically has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. The user input devices 440, which allow the mobile device 400 to receive data from a user such as the user, may include any of a number of devices allowing the mobile device 400 to receive data from a user, such as a keypad, keyboard, touch-screen, touchpad, microphone, mouse, joystick, other pointer device, button, soft key, and/or other input device(s). The user interface may also include a camera 480, such as a digital camera.

The mobile device 400 may also include a positioning system device 475 that is configured to be used by a positioning system to determine a location of the mobile device 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate location of the mobile device 400. In other embodiments, the positioning system device 475 includes a proximity sensor or transmitter, such as an RFID tag, that can sense or be sensed by devices known to be located proximate a location to determine that the mobile device 400 is located proximate these known devices.

The mobile device 400 further includes a power source 415, such as a battery, for powering various circuits and other devices that are used to operate the mobile device 400. Embodiments of the mobile device 400 may also include a clock or other timer 450 configured to determine and, in some cases, communicate actual or relative time to the processor 410 or one or more other devices.

The mobile device 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which include computer-executable instructions/code executed by the processor 410 to implement the functions of the mobile device 400 described herein. For example, the memory 420 may include such applications as a conventional web browser application 422, a mobile banking application 421, and/or a mobile wallet application. These applications also typically provide a graphical user interface (GUI) on the display 430 that allows the user to communicate with the mobile device 400, the banking system 200, and/or other devices or systems. These applications may be configured to prompt the user to provide authentication information when the user performs an electronic activity.

The memory 420 can also store any of a number of pieces of information, and data, used by the mobile device 400 and the applications and devices that make up the mobile device 400 or are in communication with the mobile device 400 to implement the functions of the mobile device 400 and/or the other systems described herein. For example, the memory 420 may include user authentication information.

Referring now to FIG. 5, a general process flow 500 is provided for escalating security protocol requirements.

At block 510, the method includes monitoring electronic activities associated with a user. In this regard, the user may employ a computing device (e.g., the mobile device 400 or computing device 300) to perform an electronic activity (e.g., in which the user interacts with the banking system 200). For example, the user may access and/or perform another activity (e.g., transfer funds or pay bills) using an online banking account at a financial institution operating the banking system 200. By way of further example, the user may perform a mobile wallet transaction. As another example, the user may purchase goods or services using a bank account at a financial institution operating the banking system 200.

Monitoring an electronic activity associated with the user typically includes identifying the local network (e.g., the local network 160) to which the computing device of the user performing a particular activity is connected. Typically, the local network is the local area network (LAN) to which the computing device of the user is connected. The banking system 200 may collect information that may be used to identify such local network, such as the service set identifier (SSID) of a wireless local area network (WLAN). In some embodiments, the banking system 200 may prompt the computing device being used by the user to provide information that can be used to identify such local network. In some embodiments, the banking system 200 may receive permission from the user before collecting information that may be used to identify the local network and/or other devices connected to the local network.

Monitoring an electronic activity associated with the user also typically includes collecting device identification information for local network devices associated with the electronic activity. As used herein, a "local network device" is any computing device (e.g., a personal computer, laptop, tablet computer, mobile phone, or the like) that is connected to the same local network as the computing device being employed by the user to perform an electronic activity. For example, if the user's computing device is connected to a wireless local area network, the local network devices would be the other computing devices connected to such wireless local area network.

Device identification information of a computing device may be any information sufficient to generate a device "fingerprint," or unique signature of the device. Device identification information may be collected from a variety of sources. In some embodiments, the device identification information includes an identification code. The identification code may be but is not limited to a serial number or an item number of the device. In some embodiments, the device identification information may be associated with a chip associated with the device. The chip may be but is not limited to a subscriber identification module (SIM) card, removable hard drive, processor, microprocessor, or the like. In other embodiments, the device identification information may be associated with a removable part of the device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the device. This unique key, code, or piece of software may then serve as device authentication information. In some embodiments, device identification information may need to be entered manually at the device. For example, the user may be prompted (e.g., via an online banking interface) to manually enter the device identification information (e.g., a serial number, an identification code, an International Mobile Station Equipment Identity (IMEI), a phone number, a chip, a removable part, or similar pieces of device identification information). In other embodiments, device identification information may not be based on user input received at the device. Instead, the device identification information may be automatically provided by the device. In yet another embodiment, the device may provide the information without requiring user input after receiving a request for the identification information.

Typically, identifying information for the local network and local network devices is collected for each electronic activity performed by the user. Typically, this collected identifying information is stored by the banking system 200 (e.g., in the activity history repository 295 or in another database).

In some embodiments, based on this collected identifying information, the banking system 200 may determine that one or more local networks are preferred local network. Typically, a preferred local network is a local network on which the user has a history of performing activities without problems (e.g., unauthorized activities), and so future activities performed over such local network have a lower likelihood of being unauthorized activities. In other words, a preferred local network may be a local network that can be trusted. For example, a preferred local network (e.g., a trusted local network) may be a local area network at the user's residence or at the user's place of employment. The banking system 200 may determine that a particular local network is a preferred local network based on the number of electronic activities performed by the user over such local network without problems exceeding a defined threshold. In other embodiments, the user and/or the financial institution may specify that a particular local network is a preferred local network.

In some embodiments, based on this collected identifying information, the banking system 200 may determine that certain local network devices are associated with certain local networks. In other words, the banking system 200 may determine a particular local network device has a history of being connected to a particular local network (e.g., a preferred local network). The banking system 200 may determine that a particular local network device is associated with a particular local network if such particular local network device was connected to such local network during at least a defined number of electronic activities performed over such local network without problems. Accordingly, such particular local network device is thought to be less likely to engage in unauthorized activities. By way of example, the banking system 200 may associate a user's spouse's mobile device with the local network at the user's residence based on the user's spouse's mobile device being connected to such local network during previous transactions. That said, in some embodiments the user and/or the financial institution may specify that a particular local network device is associated with a particular local network. The banking system 200 may store which local network devices are associated with a particular local network in a previous device database (e.g., a database in the activity history repository 295). spouse Next, at block 520, a request is received (e.g., by the banking system 200) from the user to perform a subsequent electronic activity. For example, the user may request to access the user's online banking account or to perform a mobile wallet transaction. This request is typically received from a first computing device (e.g., a mobile device) that is in communication with a first local network. The first computing device may be (i) a device on which the user has performed a previous electronic activity, (ii) a local network device associated with a previous electronic activity, or (iii) another computing device. The first local network may be a local network associated with a previous electronic activity or another local network.

Based on receiving the request to perform the subsequent electronic activity, at block 530, device identification information associated with the first computing device is typically collected. As described above, this device identification information may be any information that may be used to identify the first computing device. In addition, identifying information for the first local network may be collected.

Based on receiving the request to perform the subsequent electronic activity, at block 540, the local network devices in communication with the first local network are typically identified, and device identification information associated with such local network devices is typically collected. This device identification information may be any information that may be used to identify such local network devices.

At block 550, based on (i) the collected device identification information for the local network devices associated with the previous electronic activities, (ii) the device identification information associated with the first computing device, and/or (iii) the device identification information associated with the local network devices in communication with the first local network, (a) the subsequent electronic activity may be denied (e.g., the banking system 200 may not allow the subsequent electronic activity to be completed), (b) the level of authentication required to complete the subsequent electronic activity may be increased, or (c) the level of authentication required to complete the subsequent electronic activity may be decreased.

In one embodiment, the banking system 200 may determine that the device identification information associated with the first computing device matches device identification information for one of the local network devices associated with one of the previous electronic activities. In a particular embodiment, the banking system 200 may determine that the device identification information associated with the first computing device matches device identification information for a local network device associated with a preferred local network. Based on such determination, the banking system 200 may reduce the level of authentication required to complete the subsequent electronic activity. By way of illustration, during previous activities (e.g., previous transactions) the banking system 200 may determine that the local network located at the user's residence is a preferred network on which the user has performed numerous electronic activities. In addition, the banking system 200 may determine that the mobile device of the user's spouse is commonly connected to such local network during the previous activities, and so the banking system 200 may collect device identification information associated with such mobile device and associate such mobile device with such local area network. Thereafter, if the user uses the user's spouse's mobile device to perform a subsequent activity, the banking system 200 may determine that such device's device identification information matches device identification information for a device associated with a preferred local network. Because the user is performing the subsequent electronic activity using a device associated with a preferred local network, the subsequent electronic activity is less likely to be an unauthorized activity. Accordingly, the banking system 200 may then reduce the level of authentication required to complete the subsequent electronic activity and/or use the identity of the user's spouse's mobile device as a way of authenticating the subsequent electronic activity.

In another embodiment, the banking system 200 may determine that the device identification information associated with one of the local network devices in communication with the first local network matches device identification information associated with a device in a restricted device database. The restricted device database may be a database of devices associated with previous unauthorized activities or that are otherwise believed to be associated with an increased chance of unauthorized activities. The restricted device database may be created by the financial institution operating the banking system 200. Based on the above determination (e.g., that a restricted device is located on the first local network), the banking system 200 may deny the subsequent electronic transaction or increase the level of authentication required to complete the subsequent electronic transaction. In some particular embodiments, the banking system 200 may transmit an alert to the first computing device warning the user that a restricted device is connected to the first local network and/or may send a command to the first computing device to terminate its connection to the first local network.

In yet another embodiment, the banking system 200 may determine that the device identification information associated with one of the local network devices in communication with the first local network does not match device identification information for any local network devices previously associated with the first local network (e.g., does not match device identification information located in a previous device database associated with the first local network). In other words, the banking system 200 may determine that one of the local network devices in communication with the first local network is a device that is not typically connected to the first local network, and so there may be an increased chance of an unauthorized activity. Accordingly, based on such determination, the banking system 200 may deny the subsequent electronic transaction or, more typically, increase the level of authentication required to complete the subsequent electronic transaction. In some particular embodiments, the banking system 200 may transmit an alert to the first computing device warning the user that the first local network in connected to a device that is not typically connected to the first local network. More typically, the banking system 200 might only deny the subsequent electronic transaction, increase the level of authentication required to complete the subsequent electronic transaction, or transmit an alert to the user, if the first local network is a preferred network or is a network that is not generally publicly accessible.

As noted above, the level of authentication required to complete the subsequent electronic transaction may be increased or decreased based on (i) the collected device identification information for the local network devices associated with the previous electronic activities, (ii) the device identification information associated with the first computing device, and/or (iii) the device identification information associated with the local network devices in communication with the first local network. In this regard, the user is typically required to authenticate their identity in order to complete an activity (e.g., an electronic transaction). Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication. In some embodiments, the identity of the device being used by the user may be used to authenticate the identity of the user.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions (e.g., types of activities) are permitted.

Referring to FIG. 6A, a continuum of authentication 600A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 6C, the continuum of authentication 600A may be coupled with a functions permitted continuum 600B, first illustrated in FIG. 6B.

Referring to FIG. 6B, the functions permitted continuum 600B illustrates various levels of functions (e.g., electronic activities) permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 600B corresponds with a certain amount and/or number of functions that are permitted and/or the context in which certain functions are permitted.

Referring now to FIG. 6C, a diagram 600C illustrates a coupling of the functions permitted continuum 600B and the levels of authentication continuum 600A. As shown, the continua 600B and 600A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 600B provides that a particular function or functions may be permitted given that a specified level of authentication credentials are supplied, as indicated by the corresponding point on continuum 600A. For example, a financial institution and/or a user may arrange the continua 600B and 600A with respect to one another and may adjust the arrangement based on changing desires or goals.

In some embodiments, one or both the continua 600B and 600A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention. As noted, the level of authentication required to complete an electronic activity may be increased or decreased based on: (i) the collected device identification information for the local network devices associated with the previous electronic activities, (ii) the device identification information associated with the first computing device, and/or (iii) the device identification information associated with the local network devices in communication with the first local network. For example, if the user is typically required to provide a username and password to complete a type of activity, but the level of authentication required is increased in accordance with block 550, then the user may be prompted to provide additional (e.g., secondary) authentication information, such as a PIN (e.g., personal identification number) or a zip code associated with the user. Additionally, if the user is typically required to provide a username and password to complete a type of activity, but the level of authentication required is decreased in accordance with block 550, then the user might only be required to provide a username.

Referring now to FIG. 6D, a diagram 600D illustrates a relationship between the functions permitted and the authentication types. As shown in FIG. 6D, the soft authentication continuum between zero authentication and hard authentication may include one or more authentication types (A, B, C in the Figure). In one aspect, the one or more authentication types corresponding to the one or more authentication credentials received from the user and one or more functions are positively correlated. In one aspect, the user may have to provide authentication credentials corresponding to authentication types A and B to perform moderate functions. In another aspect, the user may have to provide authentication credentials corresponding to authentication types A, B, and C to perform most functions. In yet another aspect, the user may have to only provide authentication credentials corresponding to authentication type A to perform minimal functions. For example, a username may enable the user to gain access to checking balance via an online banking application, a username and password may enable the user to gain access to checking balance, funds transfer between the user's first bank account and second bank account, and downloading previous statements, and a username, password and challenge question may enable the user to gain complete access to all the functions of an online banking transaction. By way of further example, the user may need to provide the zip code associated with the user's account in order for the user to complete a mobile wallet transaction that exceeds a defined threshold.

After block 550, assuming the subsequent activity has not been denied, if the user provides the correct authentication information in accordance with the level of authentication required, then the banking system 200 may permit the electronic activity to be completed. In some instances, the user may be previously provided some authentication information, such as if the user previously logged in to the user's online banking account, and so the user may be prompted to provide any additional required authentication information.

As evident from the preceding description, the system described herein represents an improvement in technology by monitoring a user's electronic activities, identifying devices associated with such electronic activities, and based on the identities of such devices, increasing or decreasing the level of authentication required to complete electronic activities. Accordingly, the system provides a technical solution for overcoming the problem of how to dynamically determine the level of authentication required for a particular electronic activity. Indeed, by automatically adjusting the level of required authentication based the identity of devices associated with an electronic activity, the likelihood of an unauthorized activity being performed can be reduced.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
| --- | --- | --- | --- |
| 6967US1.014033.2593 | To be assigned | SYSTEM FOR REMOTELY CONTROLLING ACCESS TO A MOBILE DEVICE | Concurrently herewith |
| 6968US1.014033.2594 | To be assigned | MOBILE DEVICE DATA SECURITY SYSTEM | Concurrently herewith |
| 6969US1.014033.2595 | To be assigned | SYSTEM FOR AUTHORIZING ACCESS BASED ON AUTHENTICATION VIA SEPARATE CHANNEL | Concurrently herewith |
| 6971US1.014033.2597 | To be assigned | SYSTEM FOR ASSESSING NETWORK AUTHENTICATION REQUIREMENTS BASED ON SITUATIONAL INSTANCE | Concurrently herewith |

The invention claimed is:

1. A system for escalating security protocol requirements, comprising:

a computer apparatus including a processor and a memory; and a security protocol module stored in the memory, executable by the processor and configured for:

monitoring first electronic activities being performed by a user, the first electronic activities being performed on a first local network;

monitoring a frequency and a success rate of the first electronic activities performed by the user on the first local network;

based on the frequency and the success rate of the first electronic activities performed by the user on the first local network, determining that the first local network is a preferred local network;

collecting device identification information for local network devices associated with the preferred local network;

receiving from the user a request to perform a subsequent electronic activity using a first computing device, the first computing device being in communication with a second local network;

based on receiving the request to perform the subsequent electronic activity, collecting device identification information for the first computing device;

based on receiving the request to perform the subsequent electronic activity, identifying one or more local network devices in communication with the second local network and collecting device identification information for the local network devices in communication with the second local network; and based on determining that the device identification information for the first computing device matches the collected device identification information for one of the local network devices associated with the preferred local network, automatically decreasing a level of authentication required to complete the subsequent electronic activity.

2. The system according to claim 1, wherein the security protocol module is configured for:

receiving from the user a request to perform a second subsequent electronic activity on a third local network using a second computing device;

based on receiving the request to perform the second subsequent electronic activity, collecting device identification information for the second computing device;

based on receiving the request to perform the second subsequent electronic activity, identifying one or more local network devices in communication with the third local network and collecting device identification information for the local network devices in communication with the third local network;

determining that the device identification information for one of the local network devices in communication with the third local network matches device identification information from a restricted device database; and automatically denying the second subsequent electronic activity or increasing the level of authentication required to complete the second subsequent electronic activity based on determining that the device identification information for one of the local network devices in communication with the third local network matches device identification information from the restricted device database.

3. The system according to claim 2, wherein the security protocol module is configured for:

automatically denying the second subsequent electronic activity based on determining that the device identification information for one of the local network devices in communication with the third local network matches device identification information from the restricted device database.

4. The system according to claim 2, wherein the security protocol module is configured for:

automatically increasing the level of authentication required to complete the second subsequent electronic activity based on determining that the device identification information for one of the local network devices in communication with the third local network matches device identification information from the restricted device database.

5. The system according to claim 1, wherein the security protocol module is configured for:

receiving from the user a request to perform a second subsequent electronic activity on a third local network using a second computing device;

based on receiving the request to perform the second subsequent electronic activity, collecting device identification information for the second computing device;

based on receiving the request to perform the second subsequent electronic activity, identifying one or more local network devices in communication with the third local network and collecting device identification information for the local network devices in communication with the third local network;

determining that the device identification information associated with one of the local network devices in communication with the third local network does not match device identification information from a previous device database associated with the third local network; and automatically denying the second subsequent electronic activity or increasing the level of authentication required to complete the second subsequent electronic activity based on determining that the device identification information for one of the local network devices in communication with the third local network does not match device identification information from the previous device database associated with the preferred local network.

6. The system according to claim 5, wherein the security protocol module is configured for:

automatically denying the second subsequent electronic activity based on determining that the device identification information for one of the local network devices in communication with the third local network does not match device identification information from the previous device database associated with the preferred local network.

7. The system according to claim 5, wherein the security protocol module is configured for:

automatically increasing the level of authentication required to complete the second subsequent electronic activity based on determining that the device identification information for one of the local network devices in communication with the third local network does not match device identification information from the previous device database associated with the preferred local network.

8. The system according to claim 1, wherein the security protocol module is configured for:

receiving from the user a request to perform a second subsequent electronic activity on the preferred local network using a second computing device;

based on receiving the request to perform the second subsequent electronic activity, collecting device identification information for the second computing device;

based on receiving the request to perform the second subsequent electronic activity, identifying one or more local network devices in communication with the preferred local network and collecting device identification information for the local network devices in communication with the preferred local network;

determining that the device identification information for one of the local network devices in communication with the preferred local network does not match the collected device identification information for the local network devices associated with the preferred local network; and automatically denying the second subsequent electronic activity or increasing the level of authentication required to complete the second subsequent electronic activity based on (i) determining that the first local network is the preferred local network and (ii) determining that the device identification information for one of the local network devices in communication with the preferred local network does not match the collected device identification information for the local network devices associated with the preferred local network.

9. The system according to claim 8, wherein the security protocol module is configured for:

automatically denying the second subsequent electronic activity based on (i) determining that the preferred local network is the preferred local network and (ii) determining that the device identification information for one of the local network devices in communication with the preferred local network does not match the collected device identification information for the local network devices associated with the preferred local network.

10. The system according to claim 8, wherein the security protocol module is configured for:

automatically increasing the level of authentication required to complete the second subsequent electronic activity based on (i) determining that the preferred local network is the preferred local network and (ii) determining that the device identification information for one of the local network devices in communication with the preferred local network does not match the collected device identification information for the local network devices associated with the preferred local network.

11. A computer program product embodied on a non-transitory computer-readable storage medium having computer-executable instructions for:

monitoring first electronic activities being performed by a user, the first electronic activities being performed on a first local network;
monitoring a frequency and a success rate of the first electronic activities by the user on the first local network;
based on the frequency and the success rate of the first electronic activities performed by the user on the first local network, determining that the first local network is a preferred local network;
collecting device identification information for local network devices associated with the preferred local network;
receiving from the user a request to perform a subsequent electronic activity using a first computing device, the first computing device being in communication with a second local network;
based on receiving the request to perform the subsequent electronic activity, collecting device identification information for the first computing device;
based on receiving the request to perform the subsequent electronic activity, identifying one or more local network devices in communication with the second local network and collecting device identification information for the local network devices in communication with the second local network; and
based on determining that the device identification information for the first computing device matches the collected device identification information for one of the local network devices associated with the preferred local network, automatically decreasing a level of authentication required to complete the subsequent electronic activity.

12. The computer program product according to claim 11, wherein the non-transitory computer-readable storage medium has computer-executable instructions for:
receiving from the user a request to perform a second subsequent electronic activity on a third local network using a second computing device;
based on receiving the request to perform the second subsequent electronic activity, collecting device identification information for the second computing device;
based on receiving the request to perform the second subsequent electronic activity, identifying one or more local network devices in communication with the third local network and collecting device identification information for the local network devices in communication with the third local network;
determining that the device identification information for one of the local network devices in communication with the third local network does not match device identification information from a previous device database associated with the third local network; and
automatically denying the second subsequent electronic activity or increasing the level of authentication required to complete the second subsequent electronic activity based on determining that the device identification information for one of the local network devices in communication with the third local network does not match device identification information from the previous device database associated with the preferred local network.

13. The computer program product according to claim 11, wherein the non-transitory computer-readable storage medium has computer-executable instructions for:
receiving from the user a request to perform a second subsequent electronic activity on the preferred local network using a second computing device;
based on receiving the request to perform the second subsequent electronic activity, collecting device identification information for the second computing device;
based on receiving the request to perform the second subsequent electronic activity, identifying one or more local network devices in communication with the preferred local network and collecting device identification information for the local network devices in communication with the preferred local network;
determining that the device identification information for one of the local network devices in communication with the preferred local network does not match the collected device identification information for the local network devices associated with the preferred local network; and
automatically denying the second subsequent electronic activity or increasing the level of authentication required to complete the second subsequent electronic activity based on (i) determining that the first local network is the preferred local network and (ii) determining that the device identification information for one of the local network devices in communication with the preferred local network does not match the collected device identification information for the local network devices associated with the preferred local network.

14. The computer program product according to claim 11, wherein the non-transitory computer-readable storage medium has computer-executable instructions for:
receiving from the user a request to perform a second subsequent electronic activity on a third local network using a second computing device;
based on receiving the request to perform the second subsequent electronic activity, collecting device identification information for the second computing device;
based on receiving the request to perform the second subsequent electronic activity, identifying one or more local network devices in communication with the third local network and collecting device identification information for the local network devices in communication with the third local network;
determining that the device identification information for one of the local network devices in communication with the first third local network matches device identification information from a restricted device database; and
automatically denying the second subsequent electronic activity or increasing the level of authentication required to complete the second subsequent electronic activity based on determining that the device identification information for one of the local network devices in communication with the third local network matches device identification information from the restricted device database.

15. The computer program product according to claim 14, wherein the non-transitory computer-readable storage medium has computer-executable instructions for:
automatically denying the second subsequent electronic activity based on determining that the device identification information for one of the local network devices in communication with the third local network matches device identification information from the restricted device database.

16. The computer program product according to claim 14, wherein the non-transitory computer-readable storage medium has computer-executable instructions for:
  automatically increasing the level of authentication required to complete the second subsequent electronic activity based on determining that the device identification information for one of the local network devices in communication with the third local network matches device identification information from the restricted device database.

17. A method for escalating security protocol requirements, comprising:
  monitoring, via a hardware computer processor, first electronic activities being performed by a user, the first electronic activities being performed on a first local network;
  monitoring, via a hardware computer processor, a frequency and a success rate of the first electronic activities by the user on the first local network;
  based on the frequency and the success rate of the first electronic activities performed by the user on the first local network, determining, via a hardware computer processor, that the first local network is a preferred local network;
  collecting, via a hardware computer processor, device identification information for local network devices associated with the preferred local network;
  receiving, via a hardware computer processor, from the user a request to perform a subsequent electronic activity using a first computing device, the first computing device being in communication with a second local network;
  based on receiving the request to perform the subsequent electronic activity, collecting, via a hardware computer processor, device identification information for the first computing device;
  based on receiving the request to perform the subsequent electronic activity, identifying, via a hardware computer processor, one or more local network devices in communication with the second local network and collecting, via a hardware computer processor, device identification information for the local network devices in communication with the second local network; and
  based on determining, via a hardware computer processor, that the device identification information associated with the first computing device matches the collected device identification information for one of the local network devices associated with the preferred local network, automatically decreasing a level of authentication required to complete the subsequent electronic activity.

18. The method according to claim 17, comprising:
  receiving from the user a request to perform a second subsequent electronic activity on a third local network using a second computing device;
  based on receiving the request to perform the second subsequent electronic activity, collecting device identification information for the second computing device;
  based on receiving the request to perform the second subsequent electronic activity, identifying one or more local network devices in communication with the third local network and collecting device identification information for the local network devices in communication with the third local network;
  determining that the device identification information for one of the local network devices in communication with the third local network matches device identification information from a restricted device database; and
  automatically denying the second subsequent electronic activity or increasing the level of authentication required to complete the second subsequent electronic activity based on determining that the device identification information for one of the local network devices in communication with the third local network matches device identification information from the restricted device database.

19. The method according to claim 17, comprising:
  receiving from the user a request to perform a second subsequent electronic activity on a third local network using a second computing device;
  based on receiving the request to perform the second subsequent electronic activity, collecting device identification information for the second computing device;
  based on receiving the request to perform the second subsequent electronic activity, identifying one or more local network devices in communication with the third local network and collecting device identification information for the local network devices in communication with the third local network;
  determining that the device identification information for one of the local network devices in communication with the third local network does not match device identification information from a previous device database associated with the third local network; and
  automatically denying the second subsequent electronic activity or increasing the level of authentication required to complete the second subsequent electronic activity based on determining that the device identification information for one of the local network devices in communication with the third local network does not match device identification information from the previous device database associated with the preferred local network.

20. The method according to claim 17, wherein:
  monitoring the first electronic activities associated with the user comprises identifying a preferred local network associated with the user and collecting device identification information for local network devices associated with the preferred local network; and
  the method comprises:
  receiving from the user a request to perform a second subsequent electronic activity on the preferred local network using a second computing device;
  based on receiving the request to perform the second subsequent electronic activity, collecting device identification information for the second computing device;
  based on receiving the request to perform the second subsequent electronic activity, identifying one or more local network devices in communication with the preferred local network and collecting device identification information for the local network devices in communication with the preferred local network;
  determining that the device identification information for one of the local network devices in communication with the preferred local network does not match the collected device identification information for the local network devices associated with the preferred local network; and
  automatically denying the second subsequent electronic activity or increasing the level of authentication required to complete the second subsequent electronic activity based on (i) determining that the first local network is the preferred local network and (ii) determining that the device identification information for one of the local network devices in communication with the preferred local network does not match the collected device identification information for the local network devices associated with the preferred local network.

* * * * *